United States Patent
Stjernholm (10) Patent No.: US 10,193,815 B2
(45) Date of Patent: Jan. 29, 2019

(54) MOBILE NETWORK HANDLING OF UNATTENDED TRAFFIC

(71) Applicant: TELEFONAKTIEBOLAGET LM ERICSSON (PUBL), Stockholm (SE)

(72) Inventor: Paul Stjernholm, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 15/301,914

(22) PCT Filed: Apr. 4, 2014

(86) PCT No.: PCT/SE2014/050418
§ 371 (c)(1),
(2) Date: Oct. 4, 2016

(87) PCT Pub. No.: WO2015/152780
PCT Pub. Date: Oct. 8, 2015

(65) Prior Publication Data
US 2017/0118126 A1    Apr. 27, 2017

(51) Int. Cl.
| | | |
|---|---|---|
| H04L 12/801 | (2013.01) | |
| H04L 12/24 | (2006.01) | |
| H04L 5/14 | (2006.01) | |
| H04L 12/751 | (2013.01) | |
| H04L 12/851 | (2013.01) | |
| H04W 28/02 | (2009.01) | |

(Continued)

(52) U.S. Cl.
CPC ...... H04L 47/2441 (2013.01); H04L 47/2466 (2013.01); H04W 28/0268 (2013.01); H04W 28/0278 (2013.01); H04W 84/042 (2013.01)

(58) Field of Classification Search
CPC ............ H04L 47/2441; H04L 47/2483; H04L 47/263; H04L 47/41; H04W 28/08; H04W 28/10
See application file for complete search history.

(56) References Cited

U.S. PATENT DOCUMENTS 8,897,140 B1 * 11/2014 Bhattacharya ........ H04L 47/122
370/237
2006/0203713 A1 * 9/2006 Laroia ..................... H04L 5/023
370/209

(Continued)

OTHER PUBLICATIONS

UPCON general requirements, S2-124331, Publication date Nov. 12-16, 2012.*

(Continued)

*Primary Examiner* — Brian S Roberts
*Assistant Examiner* — Abusayeed Haque (57) ABSTRACT

A method in a system function capable of differently handling unattended data traffic as compared to attended data traffic. By using a dedicated policy on how to handle unattended data traffic, detected unattended data traffic is handled according to the dedicated policy. A communication device, a radio network node and a network node capable of differently handling unattended data traffic as compared to attended data traffic are provided for enforcing a policy to comply with requirements in 3GPP TS 22.101 regarding handling of unattended traffic at user plane congestion. Further embodiments provide for enforcing policies even in an uncongested state.

21 Claims, 7 Drawing Sheets

(51) Int. Cl.
   *H04L 12/855*   (2013.01)
   *H04W 84/04*   (2009.01)

(56) References Cited

U.S. PATENT DOCUMENTS

| | | | | |
|---|---|---|---|---|
| 2007/0149129 | A1* | 6/2007 | Das | H04W 72/1284 455/67.11 |
| 2007/0214254 | A1* | 9/2007 | Aguinik | H04W 40/246 709/224 |
| 2013/0044636 | A1* | 2/2013 | Koponen | H04L 47/12 370/254 |
| 2015/0142948 | A1* | 5/2015 | Szabo | H04L 41/0893 709/224 |
| 2015/0181394 | A1* | 6/2015 | Zuniga | H04W 72/005 370/312 |
| 2015/0282026 | A1* | 10/2015 | Gupta | H04W 72/042 370/331 |

OTHER PUBLICATIONS

3GPP TS 22.101 V13.0.0 3rd Generation Partnership Project; Technical Specification Group Services and System Aspects; Service aspects; Service principles (Release 13), Sep. 2013.

3GPP TR 23.705 V0.9.0 3rd Generation Partnership Project; Technical Specification Group Services and System Aspects; Study on system enhancements for user plane congestion management (Release 12), Nov. 2013.

KDDI, UPCON general requirements, SA WG2 Meeting #94 S2-124331, New Orleans, USA, Nov. 12-16, 2012.

* cited by examiner

MOBILE NETWORK HANDLING OF UNATTENDED TRAFFIC

This application is a 371 of International Application No. PCT/SE2014/050418, filed Apr. 4, 2014, the disclosure of which is fully incorporated herein by reference.

TECHNICAL FIELD

This disclosure relates to unattended traffic. In more particular, it relates to mobile network handling of unattended traffic.

BACKGROUND

This disclosure meets a requirement for the $3^{rd}$ Generation partnership project (3GPP) User plane congestion management (UPCON) Work item to limit traffic by handling unattended traffic as specified by 3GPP Technical specification (TS) 22.101. In 3GPP TS 22.101 the requirement 27.5 b) on UPCON says: The system shall be able to apply different handling (e.g. be able to prohibit or delay) all or a particular selection of Internet protocol (IP) bearer service requests depending on whether a service request is for Unattended Data Traffic or Attended Data Traffic.

There is hence a need for a technical solution meeting said requirements.

SUMMARY

It is an object of exemplary embodiments to address at least some of the issues outlined above, and this object and others are achieved by a method in a system function capable of differently handling unattended data traffic as compared to handling attended data traffic, a communication device capable of differently handling unattended data traffic as compared to handling attended data traffic, a radio network node capable of differently handling unattended data traffic as compared to handling attended data traffic, and a network node capable of differently handling unattended data traffic as compared to handling attended data traffic, according to the appended independent claims, and by embodiments of the disclosure according to the dependent claims.

According to one aspect, the present disclosure provides a method in a system function capable of differently handling unattended data traffic as compared to handling attended data traffic. The method comprises detecting unattended data traffic of an application service. The method also comprises retrieving a dedicated policy on how to handle unattended data traffic. In addition, the method comprises handling the unattended data traffic of the application service according to the dedicated policy.

According to another aspect, the present disclosure provides a computer program that comprises instructions which, when executed on at least one processor, cause the at least one processor to carry out detecting unattended data traffic of an application service. The computer program, when executed on at least one processor, also cause the at least one processor to carry out retrieving a dedicated policy on how to handle unattended data traffic. In addition, the computer program, when executed on at least one processor, also cause the at least one processor to carry out handling the unattended data traffic of the application service according to the dedicated policy.

According to another aspect, the present disclosure provides a communication device capable of differently handling unattended data traffic as compared to handling attended data traffic. The communication device is adapted to detect unattended data traffic associated with a bearer of an application service. The communication device is also adapted to handle the unattended data traffic associated with the bearer, according to a dedicated policy on how to handle unattended data traffic.

According to yet another aspect, the present disclosure provides a communication device capable of differently handling unattended data traffic as compared to handling attended data traffic, which communication device comprises a processor and a memory. The memory contains instructions executable by said processor whereby said communication device is operative to detect unattended data traffic associated with a bearer of an application service; and to handle the unattended data traffic associated with the bearer, according to a dedicated policy on how to handle unattended data traffic.

According to yet another aspect, the present disclosure provides a communication device capable of differently handling unattended data traffic as compared to handling attended data traffic, which communication device comprises means adapted to detect unattended data traffic associated with a bearer of an application service. In addition, the means is also adapted to handle the unattended data traffic associated with the bearer, according to a dedicated policy on how to handle unattended data traffic.

According to yet another aspect, the present disclosure provides a radio network node capable of differently handling unattended data traffic as compared to handling attended data traffic. The radio network node is adapted to receive a dedicated policy on how to handle unattended data traffic. The radio network node is also adapted to receive information about that unattended data traffic of an application service has been detected. In addition, the radio network node is also adapted to handle the unattended data traffic, according to the dedicated policy.

According to yet another aspect, the present disclosure provides a radio network node that is capable of differently handling unattended data traffic as compared to handling attended data traffic. The radio network node comprises a processor and a memory. The memory contains instructions executable by said processor whereby said radio network node is operative to receive a dedicated policy on how to handle unattended data traffic. The memory also contains instructions executable by said processor whereby said radio network node is operative to receive information about that unattended data traffic of an application service has been detected. In addition, the memory further contains instructions executable by said processor whereby said radio network node is operative to handle the unattended data traffic, according to the dedicated policy.

According to yet another aspect, the present disclosure provides a radio network node that is capable of differently handling unattended data traffic as compared to handling attended data traffic. The network node comprises means that is adapted to receive a dedicated policy on how to handle unattended data traffic. The means is also adapted to receive information about that unattended data traffic of an application service has been detected. In addition, the means is adapted to handle the unattended data traffic, according to the dedicated policy.

According to still yet another aspect, the present disclosure provides a network node that is capable of differently handling unattended data traffic as compared to handling attended data traffic. The network node is adapted to receive a dedicated policy or a policy indicator indicating the dedicated policy on how to handle unattended data traffic. The network node is also adapted to detect unattended data traffic of an application service, based on an indication from a communication device. In addition, the network node is adapted to handle the unattended data traffic, according to the dedicated policy.

According to still yet another aspect, the present disclosure provides a network node that is capable of differently handling unattended data traffic as compared to handling attended data traffic. The network node comprises a processor and a memory. The memory contains instructions executable by said processor whereby said network node is operative to receive a dedicated policy or a policy indicator indicating the dedicated policy on how to handle unattended data traffic. The memory contains instructions executable by said processor whereby said network node is operative to detect unattended data traffic of an application service, based on an indication from a communication device. In addition, the memory contains instructions executable by said processor whereby said network node is operative to handle the unattended data traffic, according to the dedicated policy.

According to still yet another aspect, the present disclosure provides a network node that is capable of differently handling unattended data traffic as compared to handling attended data traffic. The network node comprises means that is adapted to receive a dedicated policy or a policy indicator indicating the dedicated policy on how to handle unattended data traffic. The means is further adapted to detect unattended data traffic of an application service, based on an indication from a communication device. In addition, the means is also adapted to handle the unattended data traffic, according to the dedicated policy.

The present disclosure allows enforcing a policy to comply with requirements in 3GPP TS 22.101 regarding handling of unattended traffic at user plane congestion. In addition, it provides embodiments for enforcing policies even in an uncongested state.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

In the context of this disclosure, attended traffic is explicitly generated by the user. Unattended data traffic is typically data traffic of which the user is unaware he/she has initiated. Unattended data traffic may be based on the screen/keypad lock being activated, length of time since a user equipment (UE) last received any input from the user, known type of apps, known UE type, for example. Unattended data traffic may thus be autonomously generated.

How to decide whether data is attended or not falls outside of the scope of this disclosure. However, one way to decide whether that data is attended or unattended could be to indicate an operative status of a screen of the UE. If the screen is passive, data can be decided to be unattended. If the screen is active or activated, i.e. turned on or not in power saving mode, the data can be decided to be attended, for example.

Figure 1:
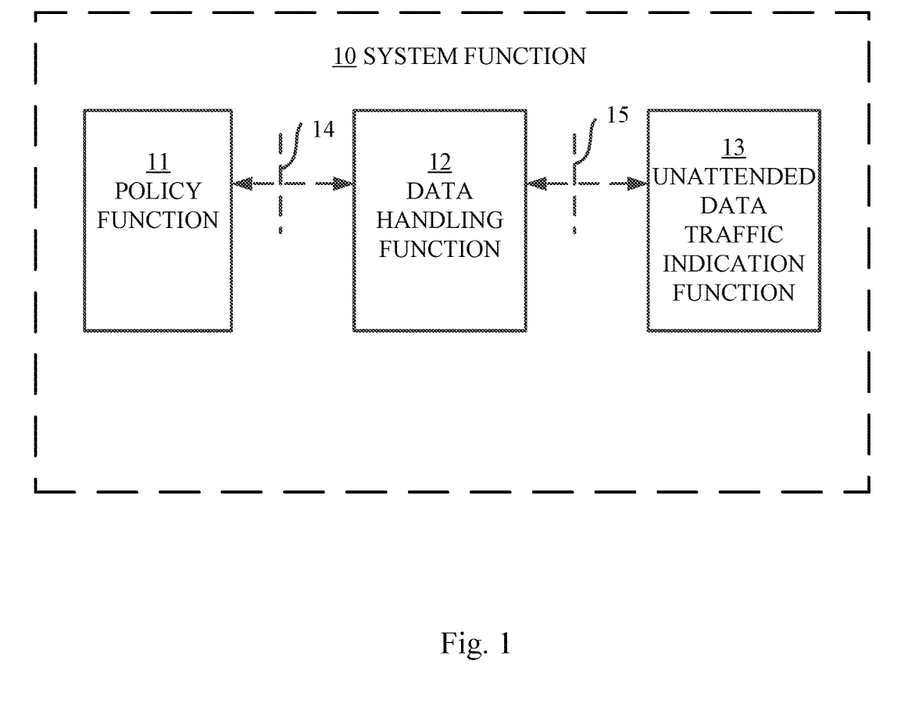
FIG. 1 schematically illustrates a system function according to embodiments of this disclosure.

FIG. 1 schematically illustrates a system function 10 according to embodiments of this disclosure. The system function comprises a policy function 11, a data handling function 12, and an unattended data traffic indication function 13. FIG. 1 also illustrates an interface 14 between the policy function 11 and the data handling function 12, and an interface 15 between the data handling function 12 and the unattended data traffic indication function 13.

The policy function 11 may be implemented in a communication device, such as a UE, in a core network node or in an operative support system (OSS). The data handling function 12 may be implemented in the communication device, in radio network node, or in the core network node. The unattended data traffic indication function 13 may also be implemented in a communication device, in a radio network node, or in a core network node.

Hence the interface 14 and/or the interface 15 can vary from one embodiment to another embodiment of the present disclosure.

Figure 2:
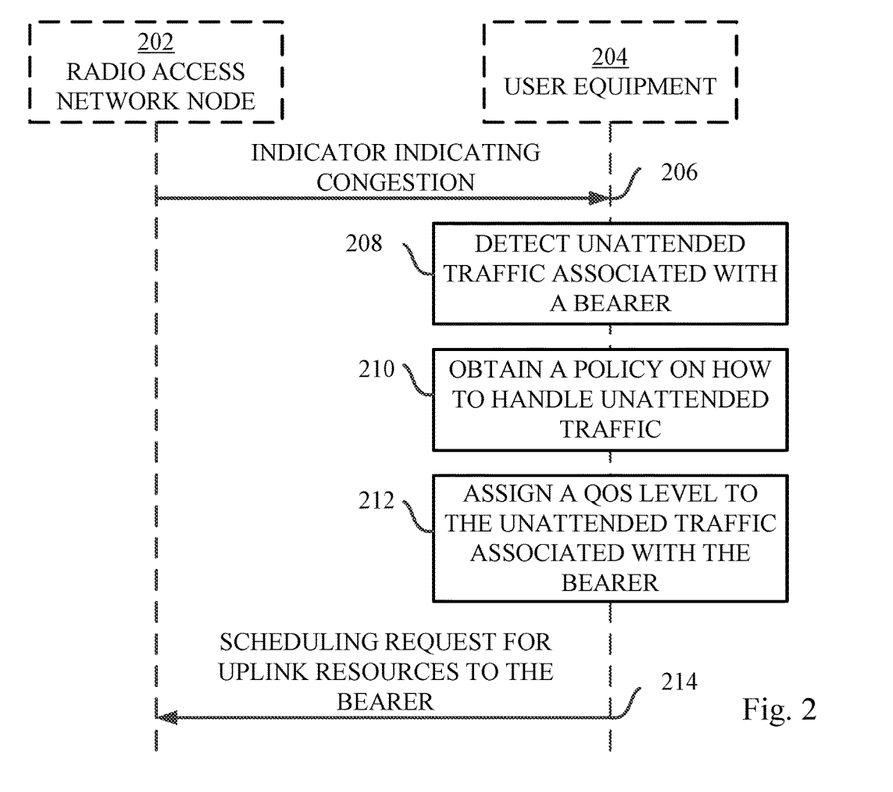
FIGS. 2 to 6 present handshake diagrams between nodes according to examples of embodiments of this disclosure.

FIG. 2 presents a handshake diagram between a radio access network node 202 and a user equipment (UE) 204, according to some embodiments of the present disclosure.

In 206 of FIG. 2, an indicator indicating congestion in the radio access network node 202 may be sent to the UE 204. In 208, UE 204 detects unattended data traffic of an application service, and where the data traffic is associated a bearer. In 210, the UE 204 obtains a dedicated policy on how to handle unattended data traffic. This dedicated policy may be retrieved from within the UE 204 when being preconfigured in the UE, for instance when set by a 3GPP standard. The dedicated policy may instruct the UE how to request scheduling grants for sending unattended data.

When a UE detects unattended data of an application service, the UE may enter an unattended mode. Requesting scheduling grants etc. may then be based on whether the UE is in unattended mode or not.

For instance, in a realization of a dedicated policy the UE may decide not to schedule data traffic when in unattended mode, or to request less amount of resources in a scheduling request, for instance by underestimating a buffer size in a buffer when reporting the buffer status report.

It can also be mentioned that the dedicated policy on how to handle unattended data traffic, may comprise as an extension a rule to exempt certain bearer types from the dedicated policy. This could be applied by adding an information entity (IE) in legacy signaling messages when establishing a bearer. By using such an IE certain bearers would thus not be targeted, and unattended data traffic would not be differentiated from attended data traffic in this respect.

Now, returning to the handshake diagram of FIG. 2, in 212, the UE assigns a quality of service (QoS) level to the unattended data traffic associated with the bearer, according to the dedicated policy.

The QoS level may represent a QoS indicator like QoS class indicator (QCI), or parameters like priority, maximum bitrate, minimum bitrate, maximum delay, etc.

It is emphasized that the policy is hence enforced within the UE 204.

In 214, a scheduling request for uplink resources to the bearer is sent by the UE 204 to the radio access network node 202.

Figure 3:
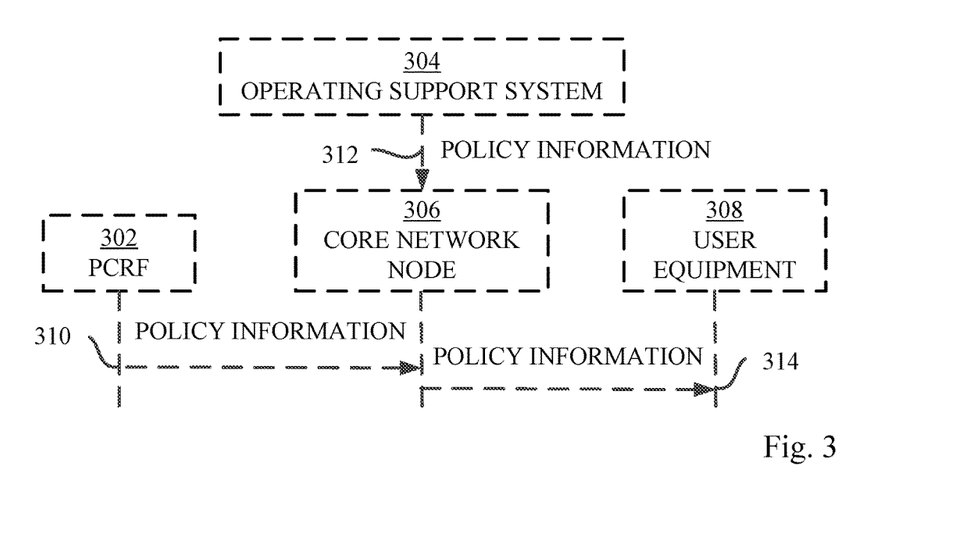

FIG. 3 presents a partial handshake diagram of signaling between a policy and charging rules function (PCRF) 302, a core network node 306, a user equipment 308, and an operating support system (OSS) 304.

It is noted that FIG. 3 illustrates embodiments of obtaining 210 a dedicated policy on how to handle unattended data traffic, as presented in FIG. 2. Instead of retrieving the dedicated policy when being pre-configured, a dedicated policy may be obtained in another way as will be described below.

In 310, the PCRF 302 may convey or send policy information or an indicator indicating the dedicated policy to the core network node 306 using either the Rx or the Gx interface. Alternatively, in 312 the policy information, the dedicated policy or an indicator indicating the dedicated policy in the core network node 306 may be configured via a management system, i.e. by the OSS 304. In 314 the core network node 306 then conveys or sends policy information, the dedicated policy or an indicator indicating the dedicated policy to the UE 308 via system information broadcasting (SIB) signaling.

The dedicated policy as conveyed in FIG. 3 may instructs the UE 308 how to request scheduling grants for sending unattended data traffic, in the same way as described in connection with FIG. 2. It can be noted that FIGS. 2 and 3 illustrate embodiments in which a UE enforces the dedicated policy on how to handle unattended data traffic.

Figure 4:
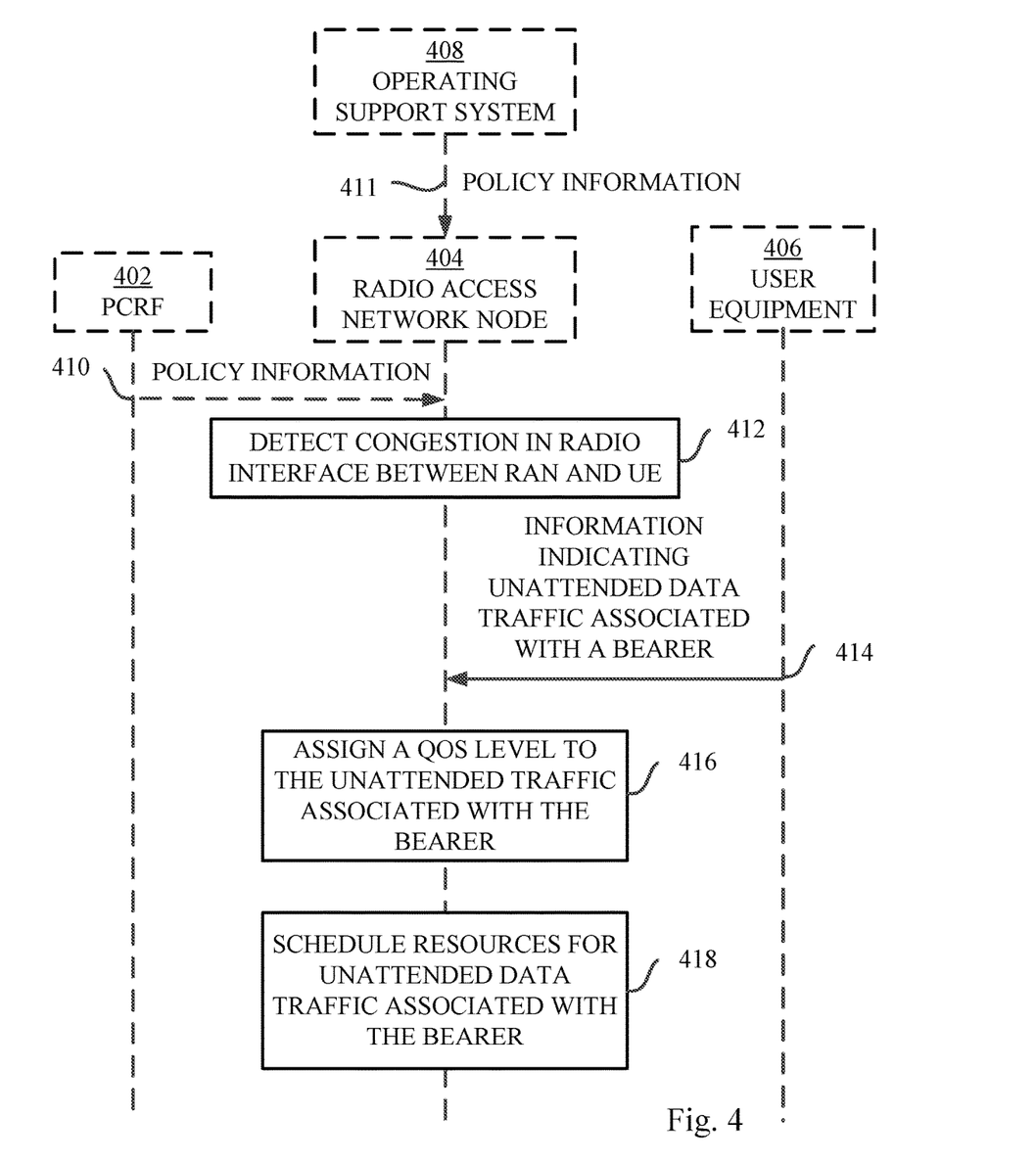

FIG. 4 illustrates a handshake diagram of signaling between a PCRF 402, a radio access network node 404 a UE 406 and an operating support system (OSS) 408, according to some embodiments of the present disclosure. As will become clear shortly it is the radio access network node that enforces a dedicated policy on how to handle unattended data traffic in this Figure.

In 410, the PCRF 402 may convey or send policy information or an indicator indicating the dedicated policy to the RAN node 404 using either the Rx or the Gx interface. Alternatively, in 411 the policy information, the dedicated policy or an indicator indicating the dedicated policy in the RAN node 404 may be configured via a management system, i.e. by the OSS 408.

It is noted that the dedicated policy may instruct the RAN node 404 even if no congestion is yet indicated.

In 412, the radio access network (RAN) node 404 may detect congestion in the radio interface between the RAN node 404 and the UE 406.

In 414, the RAN node 404 receives from the UE 406 information indicating unattended data traffic associated with a bearer for an application service in a scheduling request. It is thus the UE 406 that may indicate whether the data traffic is unattended or attended. In 416, the RAN node 404 assigns a QoS level to the unattended data traffic associated with the bearer. In 418, the RAN node schedules resources for scheduling grants for unattended data traffic associated with the bearer.

It is thus described an embodiment in which the dedicated policy is enforced in the RAN node 404.

In 414 the UE 406 may alternatively indicate and request resources to attended data traffic associated with a bearer. In 418 the RAN node 404 may use the information indicating unattended data traffic and may apply the dedicated policy received, by for instance down prioritizing unattended data traffic in uplink and downlink, while the information as received in 414 indicates unattended data traffic.

As an alternative, the UE 406 may use an internal dedicated policy as described in connection with FIGS. 2 and 3, with the difference that that dedicated policy would in this context mean to indicate unattended mode in a scheduling request in 414.

As above, a dedicated policy used in connection with FIG. 4 on how to handle unattended data traffic, may comprise as an extension a rule to exempt certain bearer types from the dedicated policy. This could be applied by adding an information entity (IE) in legacy signaling messages when establishing a bearer. By using such an IE, certain bearers would thus not be targeted, and unattended data traffic would not be differentiated from attended data traffic in this respect.

Figure 5:
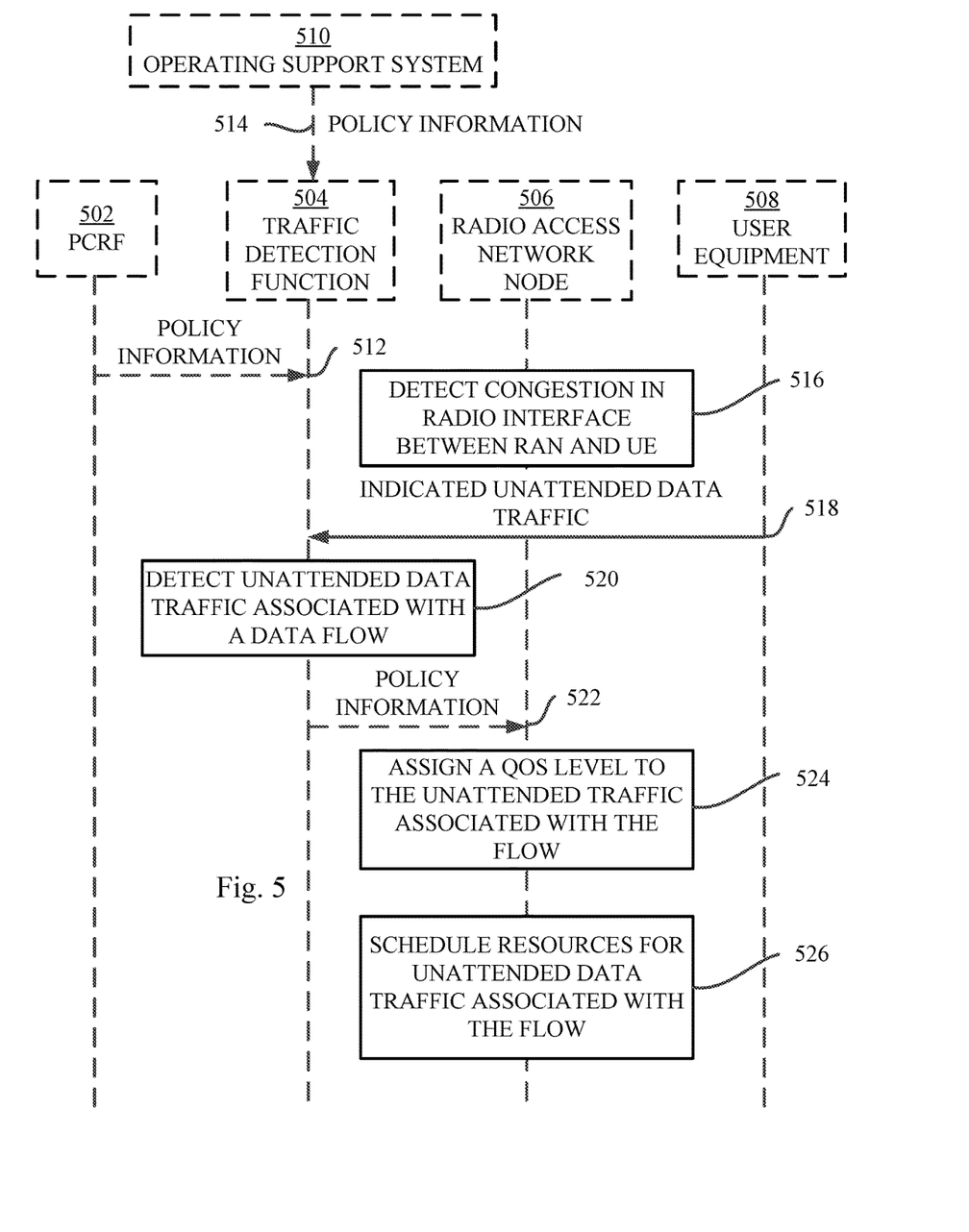

FIG. 5 illustrates a handshake diagram of signaling between a PCRF 502, a traffic detection function (TDF) 504, a RAN node 506, a UE 508 and an operating support system (OSS) 510, according to some embodiments of the present disclosure. FIG. 5 has similarities with the handshake diagram of FIG. 4.

In 512, the PCRF 502 may convey or send policy information or an indicator indicating the dedicated policy to the TDF 504 using either the Rx or the Gx interface. Alternatively, in 514 the policy information, the dedicated policy or an indicator indicating the dedicated policy to be used in the RAN node 506 may be configured via a management system, i.e. by the OSS 510 and conveyed to the TDF 504. The dedicate policy may alternatively be configured by the OSS 510 and conveyed directly to RAN node 506, in a way similar to what is described in FIG. 4. In 516, the RAN node 506 detects congestion in the radio interface between the RAN node 506 and the UE 508.

In 518, the UE 508 sends data traffic to the TDF 504, wherein the data traffic comprises an indicator indicating that the data traffic is unattended.

In 520, the TDF 504 detects unattended data traffic associated with a data flow of an application service, based on the indicator indicating that the data traffic is unattended. Here, the TDF 504 may detect uplink data packets in the user plane indicated as unattended, for instance by using transfer control protocol (TCP) header options.

In 522, the TDF 504 sends policy information, the dedicated policy or an indicator indicating the dedicated policy to the RAN node 506. The TDF 504 may relay the dedicated policy by a separate control plane interface associated with the service flow in the user plane to the RAN node 506. The TDF 504 may relay the dedicated policy by marking data packets in downlink from the TDF 504 to the RAN node 506, for instance by using General packet radio system (GPRS) tunneling protocol (GTP)—U header extensions.

In 524, the RAN node 506 assigns a QoS level to the unattended data traffic associated with the flow. In 526, the RAN node 506 schedules resources to unattended data traffic associated with the flow.

Assigning a QoS level to the unattended data traffic may comprise assigning parameters to the unattended data traffic such as priority level, minimum bit rate, maximum bit rate, or maximum delay.

It is thus described an embodiment in which the dedicated policy is enforced in the RAN node 506.

It is noted that RAN node 506 may receive the dedicated policy, to be used, in steps as described in FIG. 4, whereas the RAN node 506 may receive a policy indicator indicating the already received dedicated policy to use, in steps as described herein in FIG. 5.

In 526, the RAN node 506 may enforce the dedicated policy used on an application service flow level employing for instance downlink scheduling or pre-scheduling on packet data convergence protocol (PDCP) or by active queue management (AQM).

As an alternative, the UE 508 may use an internal dedicated policy as described in connection with FIGS. 2 and 3, with the difference that that dedicated policy would in this context instruct the UE to for instance mark data packets in the uplink using TCP options for unattended data traffic, or when in unattended mode.

Figure 6:
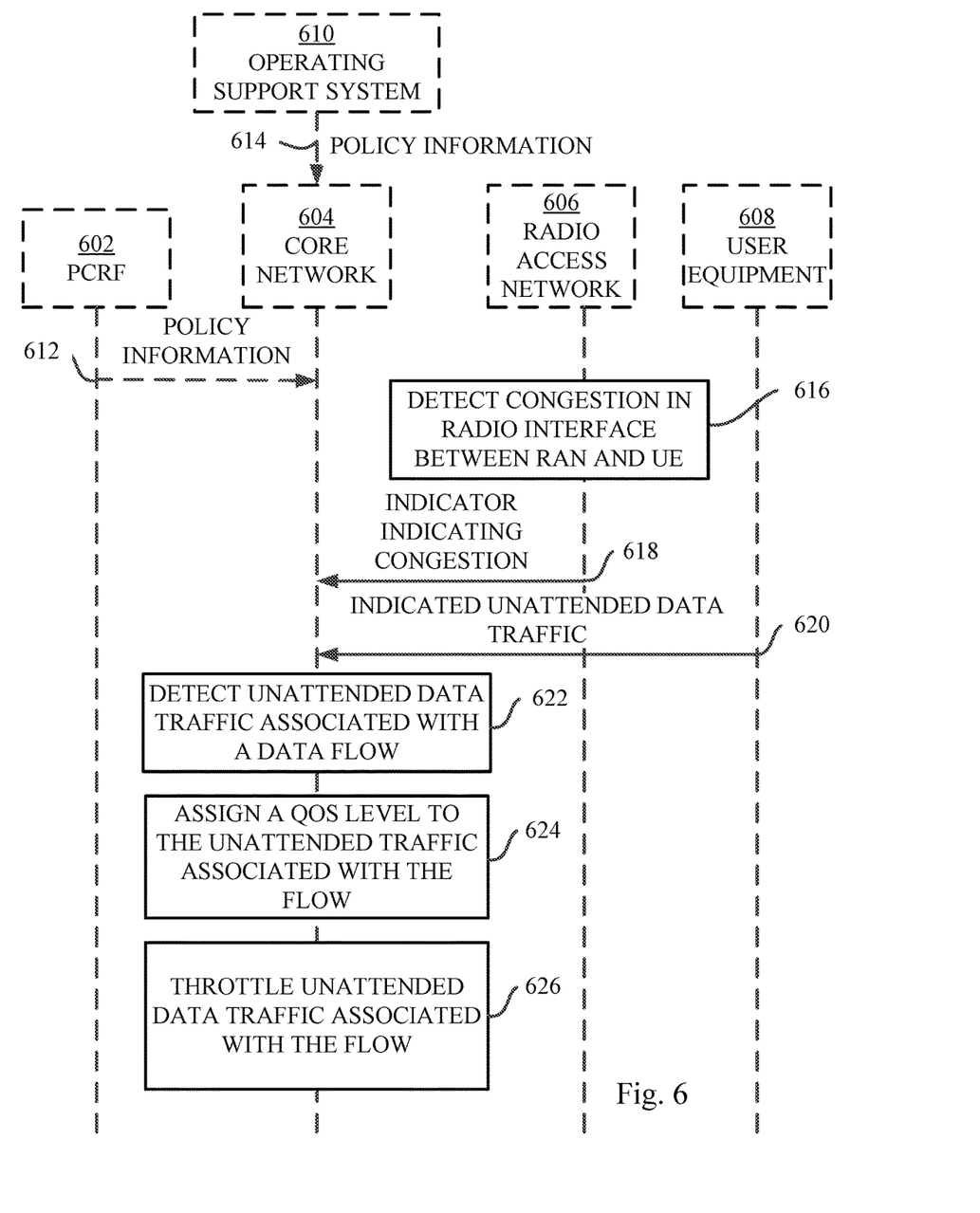

FIG. 6 illustrates a handshake diagram of signaling between a PCRF 602, a core network 604, a radio access network node 606, a UE 608 and an operating support system (OSS) 610, according to some embodiments of the present disclosure.

In this Figure enforcement of a dedicated policy to be used is executed in the core network 604.

However, in 612, the RAN 606 detects congestion in a radio interface between the RAN 606 and the UE 608.

In 614, the RAN 606 may send an indicator indicating the congestion to the core network 604.

In 616, the PCRF 602 may convey or send policy information, or an indicator indicating the dedicated policy to the core network 604 using either the Rx or the Gx interface. Alternatively, in 618 the policy information or an indicator indicating the dedicated policy may be configured via a management system, i.e. by the OSS 610 and conveyed to the core network 604.

In 620, the UE 608 sends data traffic to the core network 604, wherein the data traffic comprises an indicator indicating that the data traffic is unattended. In 622, the core network 604 detects unattended data traffic associated with a data flow, based on the indicator indicating that the data traffic is unattended. The core network 604 employs a TDF in the user plane which detects uplink data packets indicated as unattended, by for instance the use of TCP header options.

In 624, the core network 604 may assign a QoS level to the unattended data traffic associated with the flow.

Assigning a QoS level to the unattended data traffic may comprise assigning parameters to the unattended data traffic such as priority level, minimum bit rate, maximum bit rate, or maximum delay.

In 626, the core network 604 may throttle unattended data traffic associated with the flow. Both uplink and downlink data may be throttled by enforcing a dedicated policy.

Similar to the above, as an alternative, the UE 608 may use an internal dedicated policy as described in connection with FIGS. 2 and 3, with the difference that that dedicated policy would in this context instruct the UE to for instance mark data packets in the uplink using TCP options for unattended data traffic, or when in unattended mode.

Figure 7:
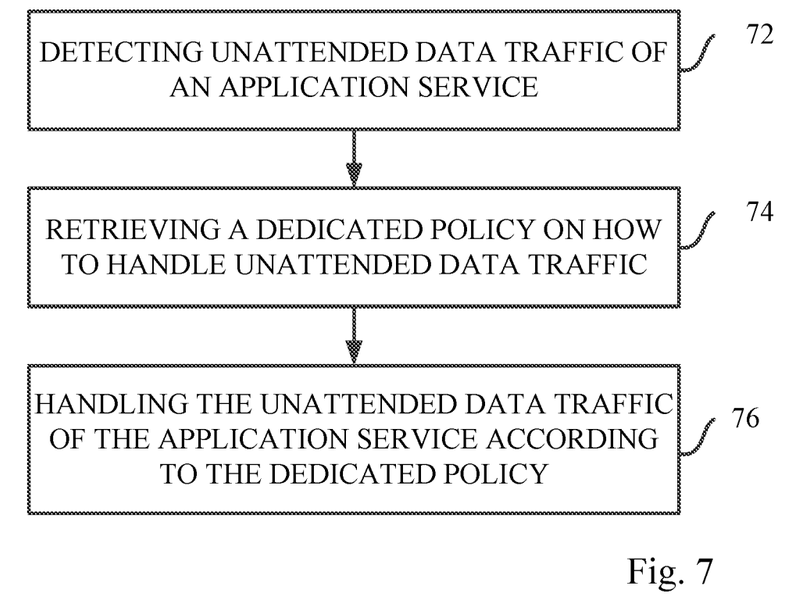
FIG. 7 illustrates a flow chart of a method according to embodiments of this disclosure.

FIG. 7 illustrates a flow chart of a method in a system function capable of differently handling unattended data traffic as compared to handling attended data traffic. The method comprises detecting 72 unattended data traffic of an application service. The method also comprises retrieving 74 a dedicated policy on how to handle unattended data traffic. In addition, the method comprises handling 76 the unattended data traffic of the application service according to the dedicated policy.

Handling the unattended data traffic may comprise handling 76 unattended data according to the dedicated policy upon detecting congestion in a radio network node.

The method may also comprise assigning a QoS level to the unattended data traffic according to the dedicated policy on how to handle unattended data traffic, and where handling 76 the unattended data traffic may comprise handling the unattended data according to the assigned QoS level.

Assigning a QoS level to the unattended data traffic may comprise assigning parameters to the unattended data traffic such as priority level, minimum bit rate, maximum bit rate, or maximum delay.

Handling 76 the unattended data traffic may comprise avoiding requesting uplink resources for said unattended data traffic.

Handling 76 the unattended data traffic may comprise underestimating a buffer size for the unattended data traffic in a buffer status report.

The present description further discloses a computer program that comprises instructions which, when executed on at least one processor, cause the at least one processor to carry out detecting 72 unattended data traffic of an application service, retrieving 74 a dedicated policy on how to handle unattended data traffic, and handling 76 the unattended data traffic of the application service according to the dedicated policy.

The present description also discloses a communication device 204 capable of differently handling unattended data traffic as compared to handling attended data traffic. The communication device is adapted to detect 208 unattended data traffic associated with a bearer of an application service. The communication device is also adapted to handle 214 the unattended data traffic associated with the bearer, according to a dedicated policy on how to handle unattended data traffic.

The communication device 204 may also be adapted to receive 206 an indication of congestion broadcasted from a radio network node, and may be adapted to handle 214 the unattended data traffic according to the dedicated policy, when the indication of congestion has been received.

The communication device 204 may further be adapted to assign 212 a QoS level to the unattended data traffic associated with the bearer, according to the dedicated policy on how to handle unattended data traffic, and may further be adapted to handle 214 the unattended data traffic according to the QoS level.

The communication device 204 may also be adapted to avoid requesting uplink resources for said unattended data traffic.

The communication device 204 may also be adapted to request uplink resources from a radio network node by underestimating a buffer size for the unattended data traffic in a buffer status report.

The communication device 204 may also be adapted to retrieve 210 the dedicated policy being pre-configured in the communication device.

The communication device 204 may also be adapted to receive 314, in a broadcast message from a core network node, a policy indicator indicating the dedicated policy.

Figure 8:
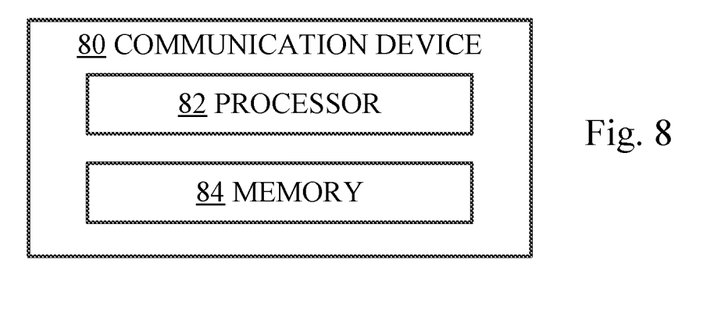
FIGS. 8 to 13 schematically illustrate communication devices, radio network nodes and network nodes according to embodiments of this disclosure.

FIG. 8 schematically illustrates a communication device 80, 204 capable of differently handling unattended data traffic as compared to handling attended data traffic. The communication device comprises a processor 82 and a memory 84. The memory contains instructions executable by said processor whereby said communication device 80, 204 is operative to detect 208 unattended data traffic associated with a bearer of an application service; and to handle 214 the unattended data traffic associated with the bearer, according to a dedicated policy on how to handle unattended data traffic.

Figure 9:
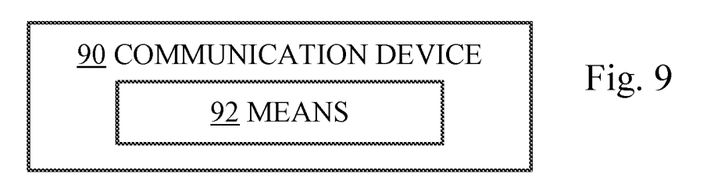

FIG. 9 schematically illustrates a communication device 90, 204 capable of differently handling unattended data traffic as compared to handling attended data traffic. The communication device comprises means 92 adapted to detect 208 unattended data traffic associated with a bearer of an application service. The means 92 is also adapted to handle 214 the unattended data traffic associated with the bearer, according to a dedicated policy on how to handle unattended data traffic.

The present description also discloses a radio network node 404, 506 capable of differently handling unattended data traffic as compared to handling attended data traffic. The radio network node is adapted to receive 410, 411, 522 a dedicated policy on how to handle unattended data traffic. The radio network node is also adapted to receive 414, 522 information about that unattended data traffic of an application service has been detected. In addition, the radio network node is also adapted to handle 418, 526 the unattended data traffic, according to the dedicated policy.

The radio network node 404, 506 may be adapted to detect 410, 516 congestion, and to handle the unattended data traffic according to the dedicated policy, when congestion has been detected.

The radio network node 404, 506 may be adapted to schedule uplink and/or downlink resources to the unattended data traffic, according to the dedicated policy.

The radio network node 404, 506 may be adapted to avoid scheduling uplink and/or downlink resources to said unattended data traffic, according to the dedicated policy.

The radio network node 404, 506 may be adapted to assign 416, 524 a QoS level to the unattended traffic of an application service according to the dedicated policy on how to handle unattended data traffic; and to handle the unattended data traffic according to the QoS level.

The radio network node 404, 506 may be adapted to assign the QoS level based on a level of consumed resources in the radio network node.

The unattended data may be associated with a bearer and the radio network node 404, 506 may be adapted to handle the unattended data traffic on a bearer level.

The radio network node 404, 506 may be adapted to receive 410, 411 the policy, or a policy indicator indicating the dedicated policy, from a core network node or from an operating support system.

The radio network node 404, 506 may be adapted to adapted to receive 414, in an uplink from a communication device, the information about that unattended data traffic of the application service has been detected.

The unattended data may be associated with a data flow, and the radio network node may further be adapted to handle 418, 526 the unattended data traffic on a data flow level.

The radio network node 404, 506 may be adapted to receive 522 the policy or a policy indicator indicating the dedicated policy from a traffic detection function, via a control interface or by marked data packets from the traffic detection function.

Figure 10:
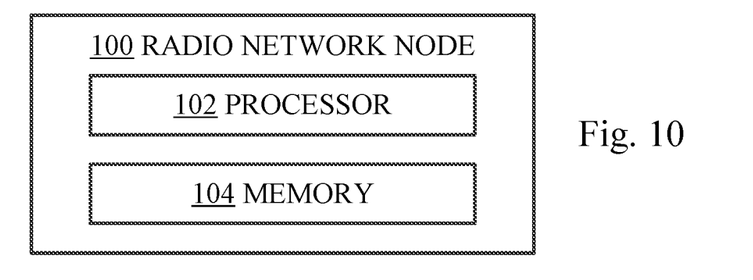

FIG. 10 schematically illustrates a radio network node 404, 506, 100 that is capable of differently handling unattended data traffic as compared to handling attended data traffic. The radio network node comprises a processor 102 and a memory 104. The memory contains instructions executable by said processor whereby said radio network node 404, 506, 100 is operative to receive 410, 411, 522 a dedicated policy on how to handle unattended data traffic. The memory contains instructions executable by said processor whereby said radio network node 404, 506, 100 is operative to receive 414, 522 information about that unattended data traffic of an application service has been detected. In addition, the memory also contains instructions executable by said processor whereby said radio network node 404, 506, 100 is operative to handle 418, 526 the unattended data traffic, according to the dedicated policy.

Figure 11:
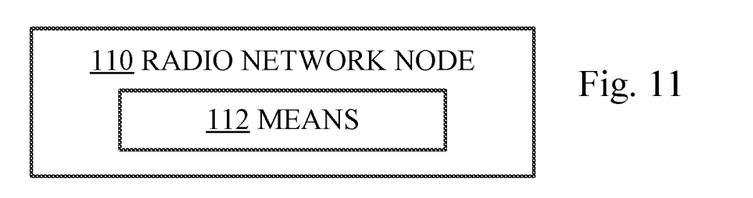

FIG. 11 schematically illustrates a radio network node 404, 506, 110 that is capable of differently handling unattended data traffic as compared to handling attended data traffic. The radio network node comprises means 112 that is adapted to receive 410, 411, 522a dedicated policy on how to handle unattended data traffic. The means is also adapted to receive 414, 522 information about that unattended data traffic of an application service has been detected. In addition, the means is adapted to handle 418, 526 the unattended data traffic, according to the dedicated policy.

The present description also discloses a network node 604 capable of differently handling unattended data traffic as compared to handling attended data traffic. The network node is adapted to receive 512, 514, 612, 614 a dedicated policy or a policy indicator indicating the dedicated policy on how to handle unattended data traffic. The network node is also adapted to detect 520, 622 unattended data traffic of an application service, based on an indication from a communication device. In addition, the network node is adapted to handle 626 the unattended data traffic, according to the dedicated policy. The network node may thus be a core network node or a traffic detection function node.

The network node 604 may further be adapted to receive 618 from a radio network node an indication of congestion in the radio network node, and to handle 626 the unattended data traffic according to the dedicated policy, when the indication has been received.

The network node 604 may further be adapted to throttle 626 the unattended data traffic, according to the dedicated policy.

The network node 604 may further be adapted to assign 624 a QoS level to the unattended traffic, according to a dedicated policy on how to handle unattended data traffic, and to handle 626 the unattended data traffic according to the QoS level.

The network node 604 may further be adapted to receive 514, 516, 612, 614 the policy or the policy indicator from a core network node or from an operating support system.

Figure 12:
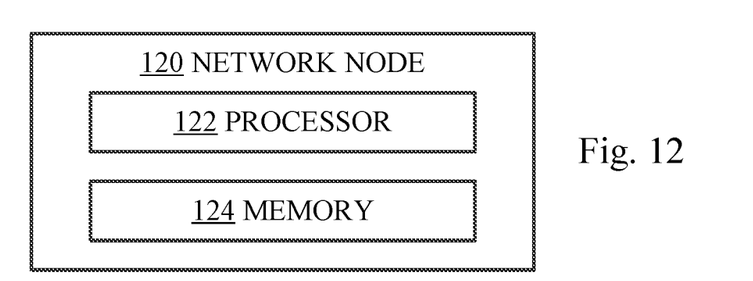

FIG. 12 schematically illustrates a network node 120, 604 that is capable of differently handling unattended data traffic as compared to handling attended data traffic. The network node comprises a processor 122 and a memory 124. The memory contains instructions executable by said processor whereby said network node 120, 604 is operative to receive 512, 514, 612, 614 a dedicated policy or a policy indicator indicating the dedicated policy on how to handle unattended data traffic. The memory contains instructions executable by said processor whereby said network node 120, 604 is operative to detect 520, 622 unattended data traffic of an application service, based on an indication from a communication device. In addition, the memory contains instructions executable by said processor whereby said network node 120, 604 is operative to handle 626 the unattended data traffic, according to the dedicated policy.

Figure 13:
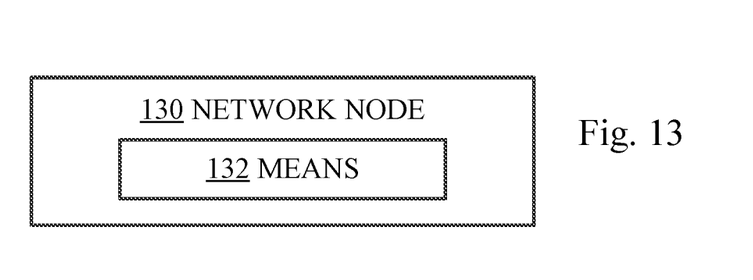

FIG. 13 schematically illustrates a network node 130 that is capable of differently handling unattended data traffic as compared to handling attended data traffic. The network node 130 comprises means 132 that is adapted to receive 512, 514, 612, 614 a dedicated policy or a policy indicator indicating the dedicated policy on how to handle unattended data traffic. The means is further adapted to detect 520, 622 unattended data traffic of an application service, based on an indication from a communication device. In addition, the means is also adapted to handle 626 the unattended data traffic, according to the dedicated policy.

The present disclosure allows enforcing a policy to comply with requirements in 3GPP TS 22.101 regarding handling of unattended traffic at user plane congestion. In addition, it provides embodiments for enforcing policies even in an uncongested state.

It may be further noted that the above described embodiments are only given as examples and should not be limiting to the present exemplary embodiments, since other solutions, uses, objectives, and functions are apparent within the scope of the embodiments as claimed in the accompanying patent claims. Henceforth one or more steps may be omitted, and/or the internal order of steps may be changed without deviating without breaching the scope of said accompanying patent claims.

ABBREVIATIONS

3GPP 3$^{rd}$ Generation partnership project
AQM active queue management
IE information entity
IP Internet protocol
OSS operating support system
PCRF policy and charging rules function
PDCP packet data convergence protocol
QCI QoS class indicator
QoS quality of service
RAN radio access network
TDF traffic detection function
TS technical specification
UE user equipment
UPCON user plane congestion management

The invention claimed is:

1. A method for handling unattended data traffic differently than attended data traffic, the method comprising: detecting unattended data traffic of an application service;
    retrieving a dedicated policy on how to handle unattended data traffic, wherein handling the unattended data traffic comprises underestimating a buffer size for the unattended data traffic in a buffer status report; and
    handling the unattended data traffic of the application service according to the dedicated policy.

2. The method according to claim 1, wherein handling the unattended data traffic comprises handling the unattended data traffic according to the dedicated policy upon detecting congestion in a radio network node.

3. The method according to claim 1, further comprising assigning a QoS level to the unattended data traffic according to the dedicated policy on how to handle unattended data traffic, and wherein handling the unattended data traffic comprises handling the unattended data traffic according to the assigned QoS level.

4. The method according to claim 1, wherein handling the unattended data traffic comprises avoiding requesting uplink resources for said unattended data traffic.

5. A computer program, comprising instructions stored in memory which, when executed on at least one processor, cause the at least one processor to perform operations comprising: detecting unattended data traffic of an application service; retrieving a dedicated policy on how to handle unattended data traffic, wherein handling the unattended data traffic comprises avoiding requesting uplink resources for the unattended data traffic; and
    handling the unattended data traffic of the application service according to the dedicated policy.

6. A communication device capable of handling unattended data traffic differently than attended data traffic, the communication device including one or more processor adapted to perform operations comprising: detecting unattended data traffic associated with a bearer of an application service;
    receive an indication of congestion broadcasted from a radio network node; and
    based on receiving the indication of congestion, handling the unattended data traffic associated with the bearer, according to a dedicated policy on how to handle unattended data traffic.

7. The communication device according to claim 6, the operations further comprising: assigning a QoS level to the unattended data traffic associated with the bearer, according to the dedicated policy on how to handle unattended data traffic; and handling the unattended data traffic according to the QoS level.

8. The communication device according to claim 6, the operations further comprising: avoiding requesting uplink resources for said unattended data traffic.

9. The communication device according to claim 6, the operations further comprising: requesting uplink resources from a radio network node by underestimating a buffer size for the unattended data traffic in a buffer status report.

10. The communication device according to claim 6, the operations further comprising: retrieving the dedicated policy that is pre-configured in the communication device.

11. The communication device according to claim 6, the operations further comprising: receiving in a broadcast message from a core network node, a policy indicator indicating the dedicated policy.

12. A radio network node capable of handling unattended data traffic differently than attended data traffic, the radio network node including one or more processor adapted to perform operations comprising: receiving a dedicated policy on how to handle unattended data traffic;
    receiving information that unattended data traffic of an application service has been detected, the unattended data traffic being associated with a bearer; and
    handling the unattended data traffic of the application service on a bearer level, according to the dedicated policy.

13. The radio network node according to claim 12, the operations further comprising: detecting congestion and handling the unattended data traffic according to the dedicated policy, when congestion has been detected.

14. The radio network node according to claim 12, the operations further comprising: scheduling uplink and/or downlink resources to the unattended data traffic, according to the dedicated policy.

15. The radio network node according to claim 12, the operations further comprising: avoiding scheduling uplink and/or downlink resources to said unattended data traffic, according to the dedicated policy.

16. The radio network node according to claim 12, the operations further comprising: assigning a QoS level to the unattended traffic of an application service according to the dedicated policy on how to handle unattended data traffic; and
    handling the unattended data traffic according to the QoS level.

17. The radio network node according to claim 16, the operations further comprising: assigning the QoS level based on a level of consumed resources in the radio network node.

18. The radio network node according to claim 12, the operations further comprising: receiving the dedicated policy, or a policy indicator indicating the dedicated policy, from a core network node or from an operating support system.

19. The radio network node according to claim 12, the operations further comprising: receiving, in an uplink from a communication device, the information that unattended data traffic of the application service has been detected.

20. The radio network node according to claim 12, wherein the unattended data traffic is associated with a data flow, and wherein the unattended data traffic is handled on a bearer or data flow level.

21. The radio network node according to claim 12, the operations further comprising: receiving the dedicated policy or a policy indicator indicating the dedicated policy from a traffic detection function, via a control interface or by marked data packets from the traffic detection function.

* * * * *